United States Patent
Guesdon (10) Patent No.: US 6,702,201 B2
(45) Date of Patent: Mar. 9, 2004

(54) AGRICULTURAL SPRAYER

(75) Inventor: Alain Guesdon, Noisy sur Ecole (FR)

(73) Assignee: Kuhn-Nodet S.A., Montereau (FR)

( * ) Notice: Subject to any disclaimer, the term of this patent is extended or adjusted under 35 U.S.C. 154(b) by 285 days.

(21) Appl. No.: 09/948,578

(22) Filed: Sep. 10, 2001

(65) Prior Publication Data

US 2002/0030120 A1 Mar. 14, 2002

(30) Foreign Application Priority Data

Sep. 14, 2000 (FR) .............................. 00 11847

(51) Int. Cl.⁷ ..................... A01G 25/09; B05B 9/00; B05B 1/20
(52) U.S. Cl. .................. 239/172; 239/146; 239/149; 239/159
(58) Field of Search .............. 239/146, 147, 239/155, 156, 157, 159, 161, 172, 722, 723, 727, 303–305, 407, 413, 149

(56) References Cited

U.S. PATENT DOCUMENTS

| | | | |
|---|---|---|---|
| 3,481,540 A | * 12/1969 | Maytum et al. | 239/1 |
| 4,005,803 A | * 2/1977 | Kent | 222/57 |
| 4,092,993 A | 6/1978 | Stevenson | |
| 4,274,585 A | * 6/1981 | Lestradet | 239/124 |
| 5,133,500 A | * 7/1992 | Simpson | 239/150 |

FOREIGN PATENT DOCUMENTS

| | | |
|---|---|---|
| FR | 2 714 572 | 7/1995 |
| WO | WO 95/03688 | 9/1995 |

OTHER PUBLICATIONS

U.S. patent application Ser. No. 09/948,578, filed Sep. 10, 2001, pending.
U.S. patent application Ser. No. 10/050,957, filed Jan. 22, 2002, pending.
U.S. patent application Ser. No. 10/051,041, filed Jan. 22, 2002, pending.
U.S. patent application Ser. No. 10/050,961, filed Jan. 22, 2002, pending.
U.S. patent application Ser. No. 09/948,578, Guesdon, filed Sep. 10, 2001.
U.S. patent application Ser. No. 10/325,938, Guesdon et al., filed Dec. 23, 2002.
U.S. patent application Ser. No. 09/355,967, filed Aug. 19, 1999, abandoned.
U.S. patent application Ser. No. 09/446,103, filed Dec. 22, 1999, allowed.
U.S. patent application Ser. No. 09/808,168, filed Mar. 15, 2001, pending.
U.S. patent application Ser. No. 09/899,154, filed Jul. 6, 2001, pending.

* cited by examiner

Primary Examiner—Davis Hwu
(74) Attorney, Agent, or Firm—Oblon, Spivak, McClelland, Maier & Neustadt, P.C.

(57) ABSTRACT

An agricultural sprayer including an induction unit capable of occupying at least one transport position and at least one filling position. A movement of the induction unit automatically predisposes a water circuit of the sprayer with a view to preparing a treatment spray mix. To do this, movement of the induction unit causes the opening or closure of at least one valve of the water circuit.

15 Claims, 10 Drawing Sheets

AGRICULTURAL SPRAYER

BACKGROUND OF THE INVENTION

1. Field of the Invention

The present invention relates to the technical field of agricultural sprayers. It relates more particularly to a method for switching a water circuit with which such a machine is equipped, to allow said water circuit to be configured in the "induction" mode.

Agricultural sprayers are used for spreading a treatment spray mix in the form of droplets onto plants. For this purpose, said sprayers include various elements connected to one another by a water circuit. These elements are, in particular, a main tank containing the spray mix, and spray nozzles intended to spread said spray mix over the plants that are to be treated. Spraying consists in pumping the spray mix, using the water circuit, from the main tank to the nozzles, while at the same time moving said nozzles with respect to the plants that are to be treated.

Before actually carrying out the spraying, the user has, amongst other things, to prepare the treatment spray mix. Now, for obvious storage reasons, the active compound of the spray mix is generally packaged in the form of concentrate in cans. Preparing the spray mix therefore consists in diluting one or more active compounds, for example plant protection products, in water. To do this, and for user-safety reasons, most agricultural sprayers also include an induction unit. This may be fixed or moveable with respect to the sprayer and is preferably accessible from the ground. The induction unit is made up of a tub into which the user tips the cans of active compound. When preparing the spray mix, the tub is emptied into the main tank via the water circuit.

After spraying, it is necessary to rinse all the elements which have been in contact with the treatment spray mix. This is because said spray mix tends, when it is stagnant, to form a deposit that is detrimental to the correct operation of said sprayer. To this end, most sprayers additionally include a reserve of water stored in a rinsing tank. Rinsing consists in pumping this reserve of water, via the water circuit, from said rinsing tank to the sullied elements. The spray mix residue, highly diluted in the rinsing water, is finally expelled onto said plants via the spray nozzles.

In general, the water circuit of an agricultural sprayer also allows the main tank to be filled by pumping water from a river, for example. In addition it is common place for said water circuit also to allow said main tank to be emptied by transferring the treatment spray mix to an external tank.

In order to perform the various functions listed hereinabove, the water circuit includes at least one pump, a set of pipes and several valves. In a way known to the person skilled in the art, the position of said valves determines the type of function performed by the water circuit ("spraying", "induction", "rinsing", "filling", "emptying").

2. Discussion of the Background

With most agricultural sprayers currently on the market and in particular the sprayer described in patent application WO 95/03 688, the user configures the water circuit by manipulating each of the valves individually so as to position these valves in accordance with a layout corresponding to the desired function. Now, an agricultural sprayer generally has a great many valves, and each valve can be oriented into at least two different positions. Configuring such a water circuit, that the user changes each time there is a change in function, therefore constitutes a relatively great loss of time.

In addition, with this type of manipulation, the risk of error in positioning the valves or quite simply the risk of forgetting to orient a valve, is not inconsiderable. In such an instance, the function performed by the water circuit is not the one desired by the user. The consequence of this may, for example, be loss of said active compound.

In order to solve this problem, patent application FR 2,714,572 describes an agricultural sprayer in which some valves of the water circuit are operated by a control unit. With this known sprayer, the user first of all selects the function that is to be performed, by means of a selector. Then, the control element electrically drives various valves of the water circuit so as to configure the latter in the appropriate mode. However, the use of such a solution probably leads to a not insignificant manufacturing on-cost. In addition, this solution still entails the intervention of the user, for example when preparing the treatment spray mix, to indicate the type of function to be performed. In consequence, the risks of error are not eliminated. For example, the user may forget to select the "induction" function. He may just as easily select the wrong function.

SUMMARY OF THE INVENTION

The object of the present invention is therefore to remedy the various drawbacks of the state of the art by proposing a solution for an agricultural sprayer comprising a moving induction unit, so as to eliminate any risk of oversight and error in manipulation when configuring the water circuit in the "induction" mode.

Accordingly, there is proposed a method for switching the configuration of a water circuit of an agricultural sprayer to "induction" mode, said sprayer including an induction unit capable of occupying at least one transport position and at least one filling position, wherein a movement of said induction unit from a transport position into a filling position switches the configuration of said water circuit to the "induction" mode. With agricultural sprayers including a moving induction unit and when preparing the spray mix, the user brings the induction unit into a filling position so as to make it easier to tip the cans of active compound. With the switching method of the present invention, this action prior to any induction has the effect of automatically, and therefore quickly, configuring the water circuit of the sprayer for the appropriate function. As the user no longer operates said valves manually, the risk of oversight and errors of manipulation are therefore eliminated.

The present invention also relates to an agricultural sprayer for implementing this switching method. Said sprayer therefore includes a moving induction unit and a water circuit configured by valves. According to another feature of the present invention, the movement of the induction unit acts directly on the valves involved in configuring the water circuit in the "induction" mode. In consequence, the means for implementing the method of the present invention are simple and therefore inexpensive.

BRIEF DESCRIPTION OF THE DRAWINGS

Other features of the invention will also become apparent from the other subclaims and from the following description of one nonlimiting exemplary embodiment of the invention depicted in the appended drawings, in which:

DESCRIPTION OF THE PREFERRED EMBODIMENT

Figure 1:
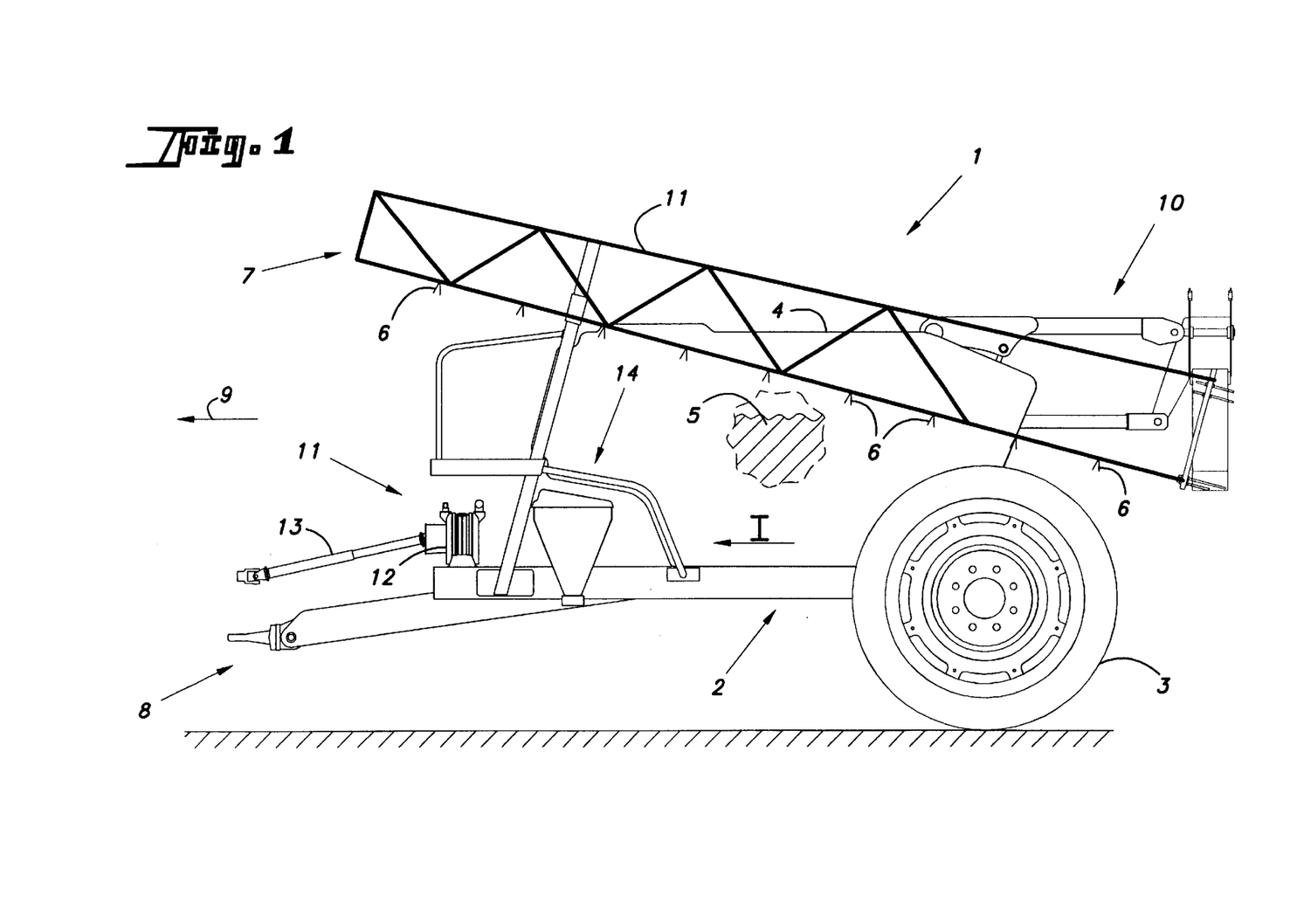
FIG. 1 depicts, in a side view and during transport, an agricultural sprayer according to the invention.

FIG. 1 depicts an agricultural sprayer 1 according to the invention, in the transport position. Said sprayer 1 includes a chassis 2 which runs along the ground by means of two wheels 3. Said chassis 2 supports, on one hand, a main tank 4 containing a treatment spray mix 5 and, on another hand, several spray nozzles 6 arranged at substantially uniform intervals along a spray boom 7. Said chassis 2 is connected, in a known way, to a motor vehicle (not depicted) by means of a drawbar 8. Said motor vehicle trails said sprayer 1 in a direction of forward travel 9. In this exemplary embodiment, said sprayer 1 is therefore of the trailed type. It goes without saying that the present invention relates also to sprayers of the mounted type and to self-propelled sprayers.

During work, said agricultural sprayer 1 is moved over a field containing plants that are to be treated. Said spray boom 7 is arranged transversely to said direction of forward travel 9, on each side of a vertical mid-plane of said sprayer 1. Said spray boom 7 is connected to said chassis 2 by means of a connecting device 10. The spray height of said nozzles 6 can thus be adapted to suit the taller or shorter height of the plants that are to be treated. For further information about said connecting device 10, those skilled in the art may refer to the U.S. application registered under the Ser. No. 09/808,168. For its part, said treatment spray mix 5 is pumped, by means of a water circuit 11, from the main tank 4 to be deposited, by virtue of said spray nozzles 6, on said plants.

Aside from the "spraying" function described hereinabove, said water circuit 11 is also called upon to carry out other functions, for example: "filling", "induction", "rinsing" and "emptying". For this purpose, in the exemplary embodiment depicted in FIGS. 2 to 7, said water circuit 11 includes, in particular, a pump 12, a set of pipes and several valves. In a way known to those skilled in the art, the position of said valves determines the type of function carried out by said water circuit 11. In a way also known to those skilled in the art, said pump 12 is driven in rotation by means of a universally-jointed transmission shaft 13, by the power take-off (not depicted) of said motor vehicle. The various other functions listed above will be described later on.

As visible in FIG. 1, said agricultural sprayer 1 additionally includes an induction unit 14. The role and embodiment of said induction unit 14 will also be described later.

For reasons of clarity, said set of pipes and said valves are not shown in FIG. 1.

Figure 2:
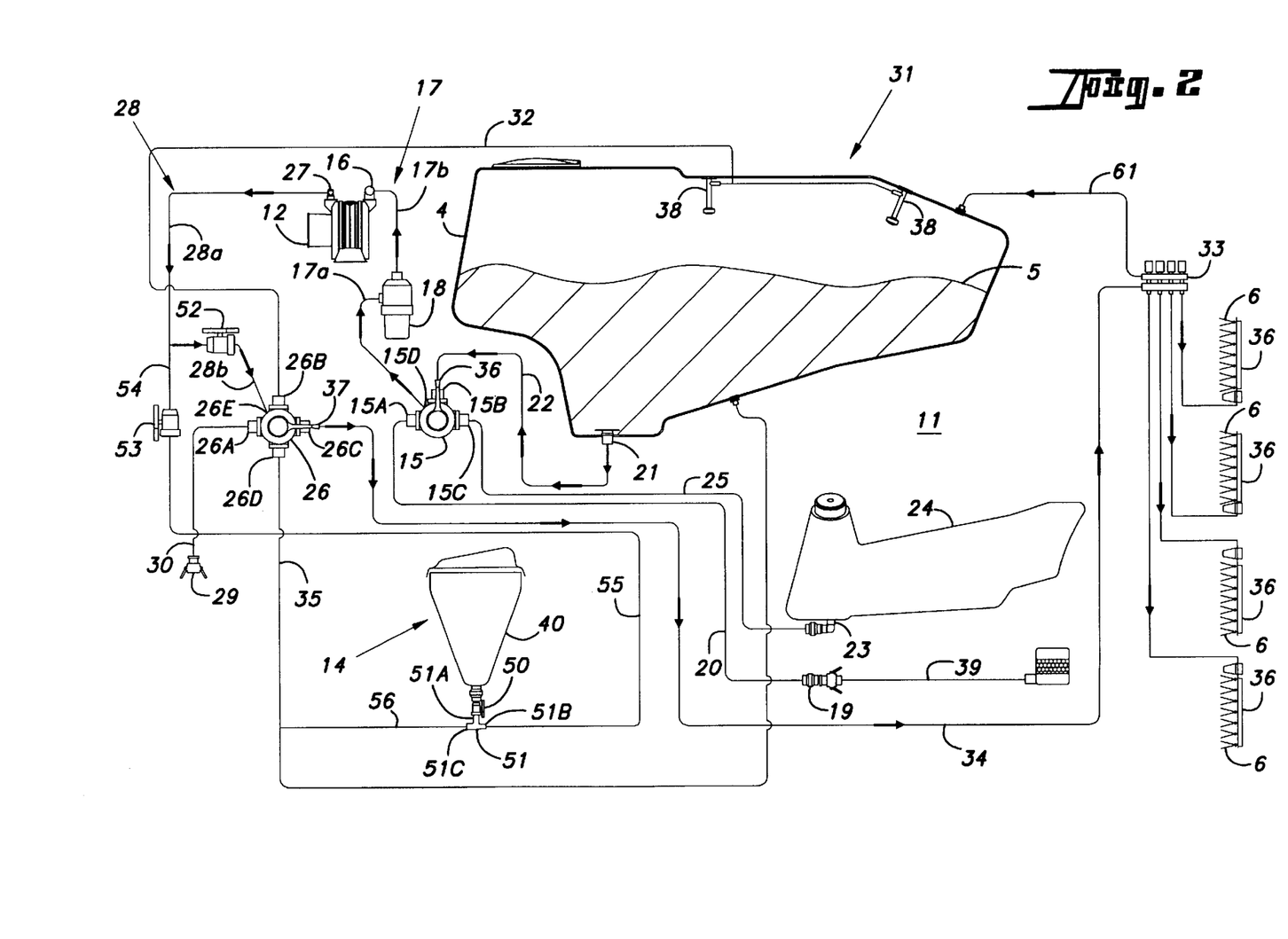
FIG. 2 is a diagram of a water circuit equipping the agricultural sprayer of FIG. 1, said water circuit being configured in the "spraying" mode.

FIG. 2 schematically depicts an exemplary embodiment of a water circuit 11 with which the agricultural sprayer 1 of FIG. 1 may be equipped. Said water circuit 11 includes a first selector valve 15 arranged upstream of said pump 12. This first selector valve 15 allows the user to select the source from which said pump 12 is fed. For this purpose, said first selector valve 15 has three inlet ports 15A, 15B, 15C and one outlet port 15D. Said outlet port 15D of said first selector valve 15 is connected to the intake orifice 16 of said pump 12 by means of a first pipe 17. The first inlet port 15A is connected to a first external connector 19 by means of a second pipe 20. Said first external connector 19 advantageously allows said water circuit 11 to be fed from a source external to said sprayer 1. The second inlet port 15B is connected to a drain 21 arranged at the lowermost point of said main tank 4 (depicted in section in FIGS. 2 to 7) by means of a third pipe 22. For its part, the third inlet port 15C is connected to a second drain 23, this time arranged at the lowermost point of a rinsing tank 24, by means of a fourth pipe 25. Said rinsing tank 24 will be described later.

Said water circuit 11 also includes a second selector valve 26 arranged downstream of said pump 12. This second selector valve 26 allows the user to choose the destination of the fluid delivered by said pump 12. For this purpose, said second selector valve 26 includes, for its part, four outlet ports 26A, 26B, 26C, 26D and one inlet port 26E. Said inlet port 26E of said second selector valve 26 is connected to the delivery orifice 27 of said pump 12 by means of a fifth pipe 28. The first outlet port 26A is connected to a second external connector 29 by means of a sixth pipe 30. Said second external connector 29 advantageously makes it possible to transfer the contents of the main tank 4 into a tank external to said sprayer 1. The second outlet port 26B is connected to a rinsing device 31 for rinsing said main tank 4, by means of a seventh pipe 32. Said rinsing device 31 will be described later on. The third outlet port 26C is connected to a distribution device 33 by means of an eighth pipe 34. Said distribution device 33 will also be described later on. For its part, the fourth outlet port 26D of said second selector valve 26, is connected to said main tank 4 by means of a ninth pipe 35.

In the exemplary embodiment depicted in FIGS. 2 to 7, said water circuit 11 also includes a filter 18 connected to said first pipe 17. Said filter 18, arranged therefore between said first selector valve 15 and said pump 12, is intended to protect said pump 12 against any impurities that might be present in the fluid sucked up. Said first pipe 17 therefore has two portions 17a, 17b. The first portion 17a connects said first selector valve 15 to said filter 18. For its part, the second section 17b connects said filter 18 to said pump 12.

In the exemplary embodiment depicted in FIGS. 2 to 7, each selector valve 15, 26 also has a respective handle 36, 37. Thus, said handle 36 allows the user, in the case of said first selector valve 15, to place one of said inlet ports 15A, 15B, 15C in communication with said outlet port 15D. For its part, said handle 37 allows the user, in the case of said second selector valve 26, to place said inlet port 26E in communication with one of said outlet ports 26A, 26B, 26C, 26D.

In FIGS. 2 to 7, each arrow on a pipe indicates the direction of flow of the fluid inside said pipe. No arrow on a pipe, on another hand, indicates that said pipe does not convey fluid in the function under consideration.

FIG. 2 more particularly depicts the water circuit 11 configured in the "spraying" mode. During work, this function is used to deposit said treatment spray mix 5 in the form of droplets on the plants that are to be treated.

To do this, the user, on one hand, by means of said first selector valve 15, places the intake orifice 16 of said pump 12 in communication with the drain 21 of said main tank 4. On another hand, the user, by means of said second selector valve 26, places the delivery orifice 27 of said pump 12 in communication with said distribution device 33.

In a way known to those skilled in the art, said distribution device 33 makes it possible to adjust and to regulate the amount of treatment spray mix 5 deposited on said plants. In a way also known to those skilled in the art, said spray nozzles 6 are advantageously grouped together in sections 36. Thus, by cutting the supply of spray mix 5 to one or more sections 36, the user can adapt the working width of the sprayer 1. The surplus treatment spray mix 5 arriving from said pump 12 and not distributed to the various nozzles 6 is returned to said main tank 4 by means of a tenth pipe 37.

Figure 3:
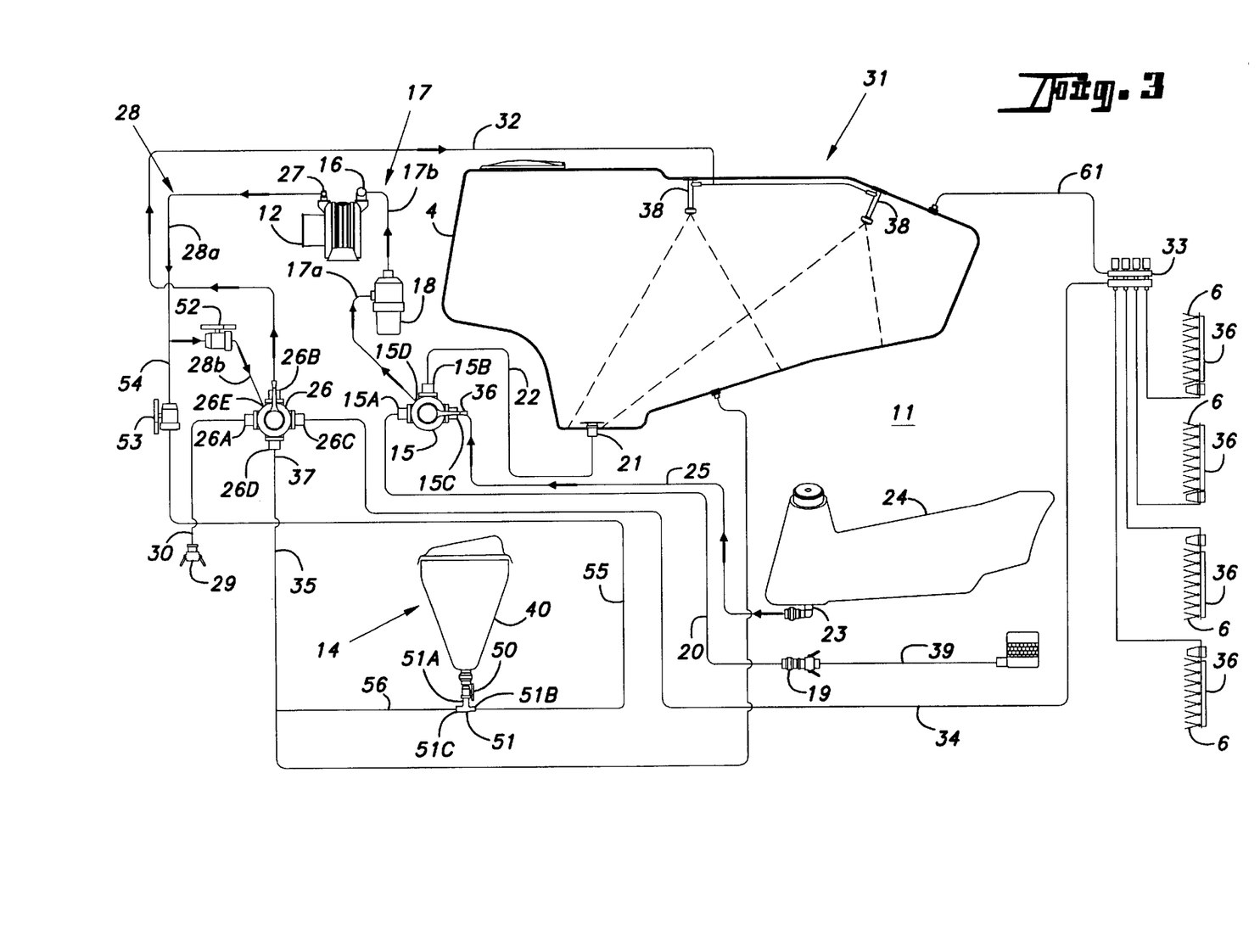
FIG. 3 is a diagram of the water circuit equipping the agricultural sprayer of FIG. 1, said water circuit being configured in the "tank rinsing" mode.
Figure 4:
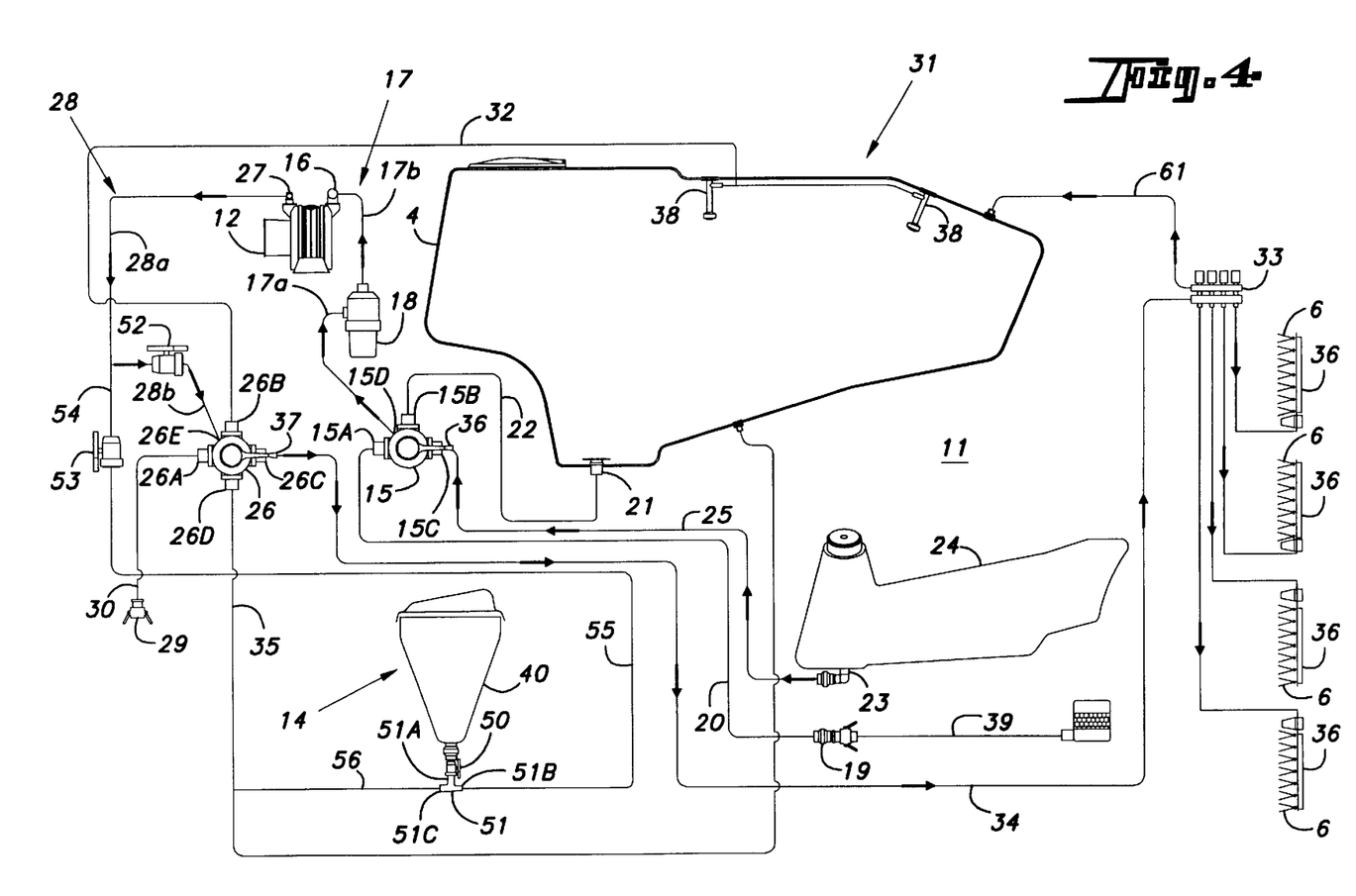
FIG. 4 is a diagram of the water circuit equipping the agricultural sprayer of FIG. 1, said water circuit being configured in the "boom rinsing" mode.

FIGS. 3 and 4 depict the water circuit 11 of FIG. 2 configured this time in the "rinsing" mode. This function is generally used once spraying is finished. This is because when said treatment spray mix 5 lies stagnant for a certain period of time, it tends to form a deposit which is detrimental to the correct operation of said water circuit 11. To avoid this deposit, it is necessary to rinse all the elements which have been in contact with said spray mix 5. In a way known to those skilled in the art, the agricultural sprayer 1 for this purpose has a rinsing tank 24. Said rinsing tank 24 (not depicted in FIG. 1) is able to store a reserve of water. During rinsing, this reserve of water circulates through all the sullied elements. Finally, the treatment spray mix 5 residue, highly diluted in the rinsing water, is expelled through said spray nozzles 6.

FIG. 3 more particularly depicts a configuration of said water circuit 11 that makes it possible to rinse said main tank 4. To do this, the user on one hand, by means of said first selector valve 15, places the intake orifice 16 of said pump 12 in communication with the drain 23 of said rinsing tank 24. On another hand, by means of said second selector valve 26, the user places the delivery orifice 27 of said pump 12 in communication with said rinsing device 31. In a way known to those skilled in the art, said rinsing device 31 is made up of several rinsing nozzles 38. Said rinsing nozzles 38 are intended to hose down the interior walls of said main tank 4 with the water contained in the rinsing tank 24. For reasons of clarity, only two rinsing nozzles 38 have been depicted in FIGS. 2 to 7. It goes without saying that in actual fact the entirety of the interior walls of the main tank 4 is reached by the jet from said rinsing nozzles 38.

To finish rinsing said agricultural sprayer 1, the user then configures said water circuit 11 into the "boom rinsing" mode as depicted in FIG. 4. This function this time allows the water contained in the rinsing tank 24 to be pumped and circulated in particular through the pipe 34, the distribution device 33, the tenth pipe 61 and said spray nozzles 6. To do this, the user on one hand, by means of said first selector valve 15, places the intake orifice 16 of said pump 12 in communication with the drain 23 of said rinsing tank 24. On another hand, the user, by means of said second selector valve 26, places the delivery orifice 27 of said pump 12 in communication with said distribution device 33.

Figure 5:
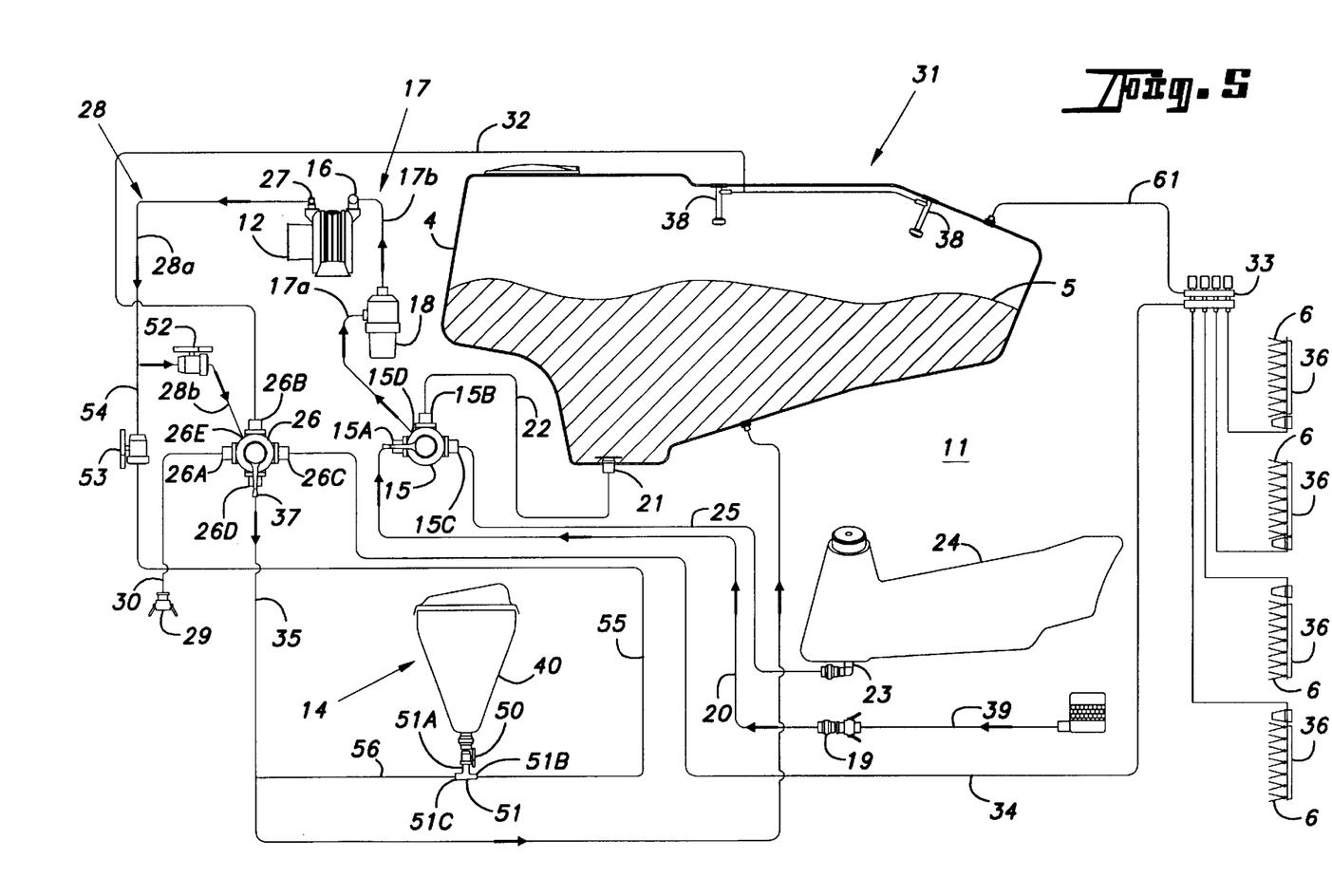
FIG. 5 is a diagram of the water circuit equipping the agricultural sprayer of FIG. 1, said water circuit being configured in the "filling" mode.

The "suction" function depicted in FIG. 5 allows the user to fill said main tank 4 from an external source. Thus, by connecting said first external connector 19 to a strainer 39, the user can advantageously draw water from a river. To do this, the user, on one hand, by means of said first selector valve 15, places the intake orifice 16 of said pump 12 in communication with said first external connector 19. On another hand, by means of said second selector valve 26, the user places the delivery orifice 27 of said pump 12 in communication with said main tank 4.

Figure 6:
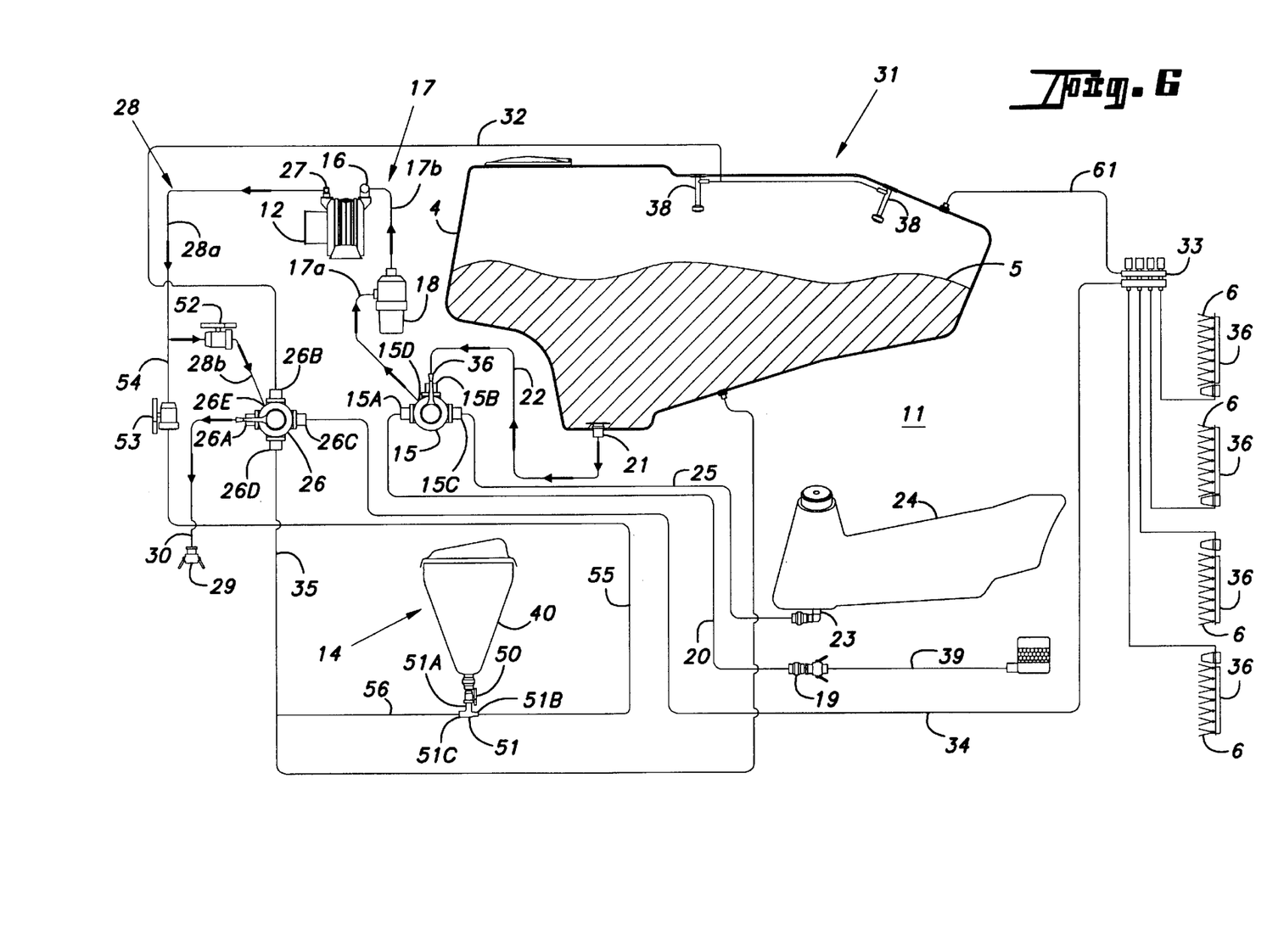
FIG. 6 is a diagram of the water circuit equipping the agricultural sprayer of FIG. 1, said water circuit being configured in the "emptying" mode.
Figure 7:
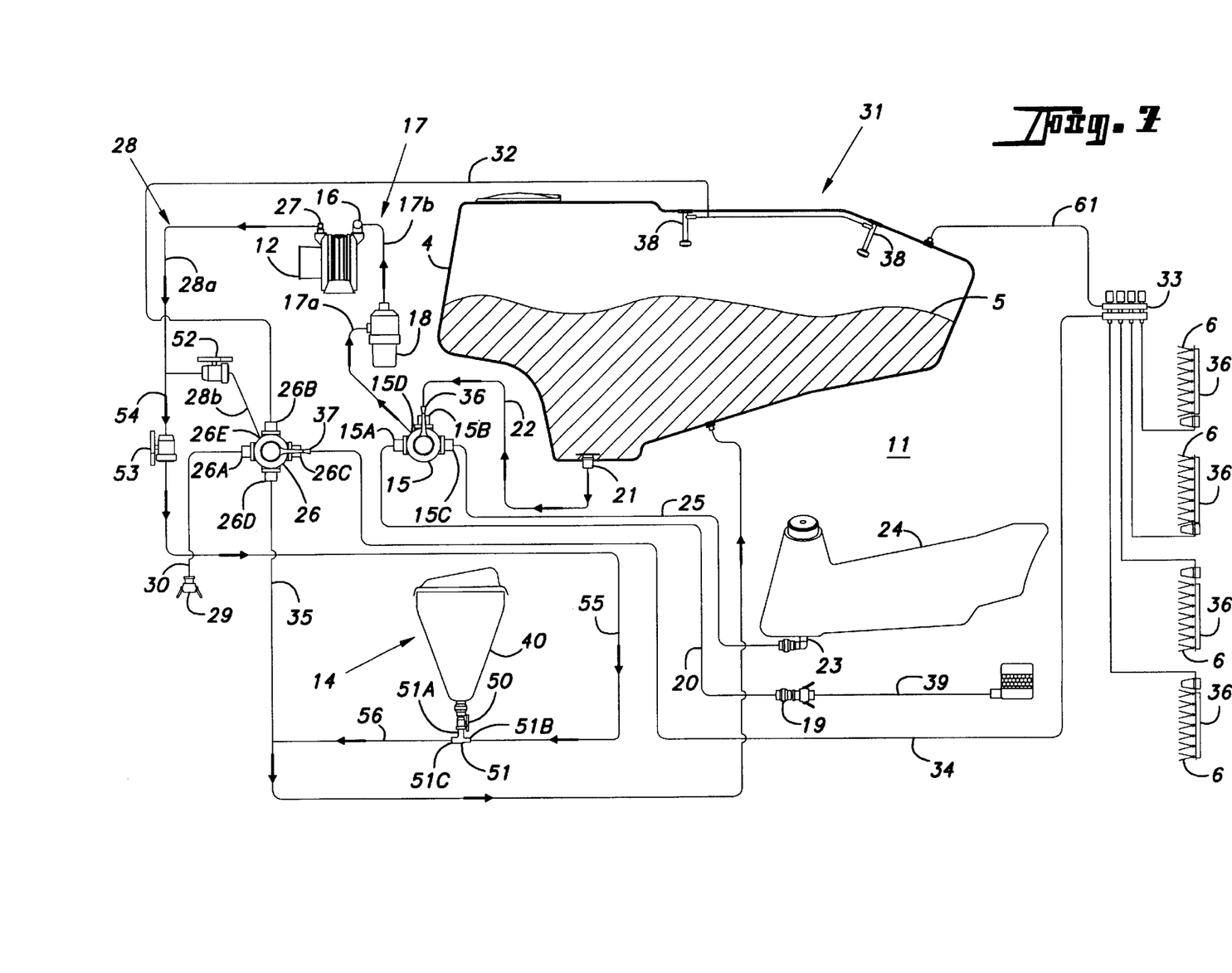
FIG. 7 is a diagram of the water circuit equipping the agricultural sprayer of FIG. 1, said water circuit being configured in the "induction" mode.

By contrast, the "emptying" function depicted in FIG. 6 allows the user to transfer the contents of said main tank 4 to an external tank (not depicted). Having connected said external tank to said second external connector 29, the user, on one hand, by means of said first selector valve 15, places the intake orifice 16 of said pump 12 in communication with the drain 21 of said main tank 4. On another hand, by means of said second selector valve 26, the user places the delivery orifice 27 of said pump 12 in communication with said second external connector 29.

Before actually carrying out spraying, the user has to prepare the treatment spray mix 5. This is because for obvious storage reasons, the active compound for the spray mix 5 is generally packaged in the form of concentrate in cans. Preparing the spray mix 5 therefore consists in diluting one or more active compounds, for example plant protection products, in water. To do this, said agricultural sprayer 1 includes an induction unit 14. Said induction unit 14 is made up of a tub 40 into which the user tips the cans of active compound. When preparing said spray mix 5, said tub 40 is emptied via the water circuit 11 into the main tank 4. Said induction unit 14 is advantageously moveable with respect to said sprayer 1. It may thus occupy a transport position (FIGS. 1, 8 and 10) or a filling position (FIG. 9).

Figure 8:
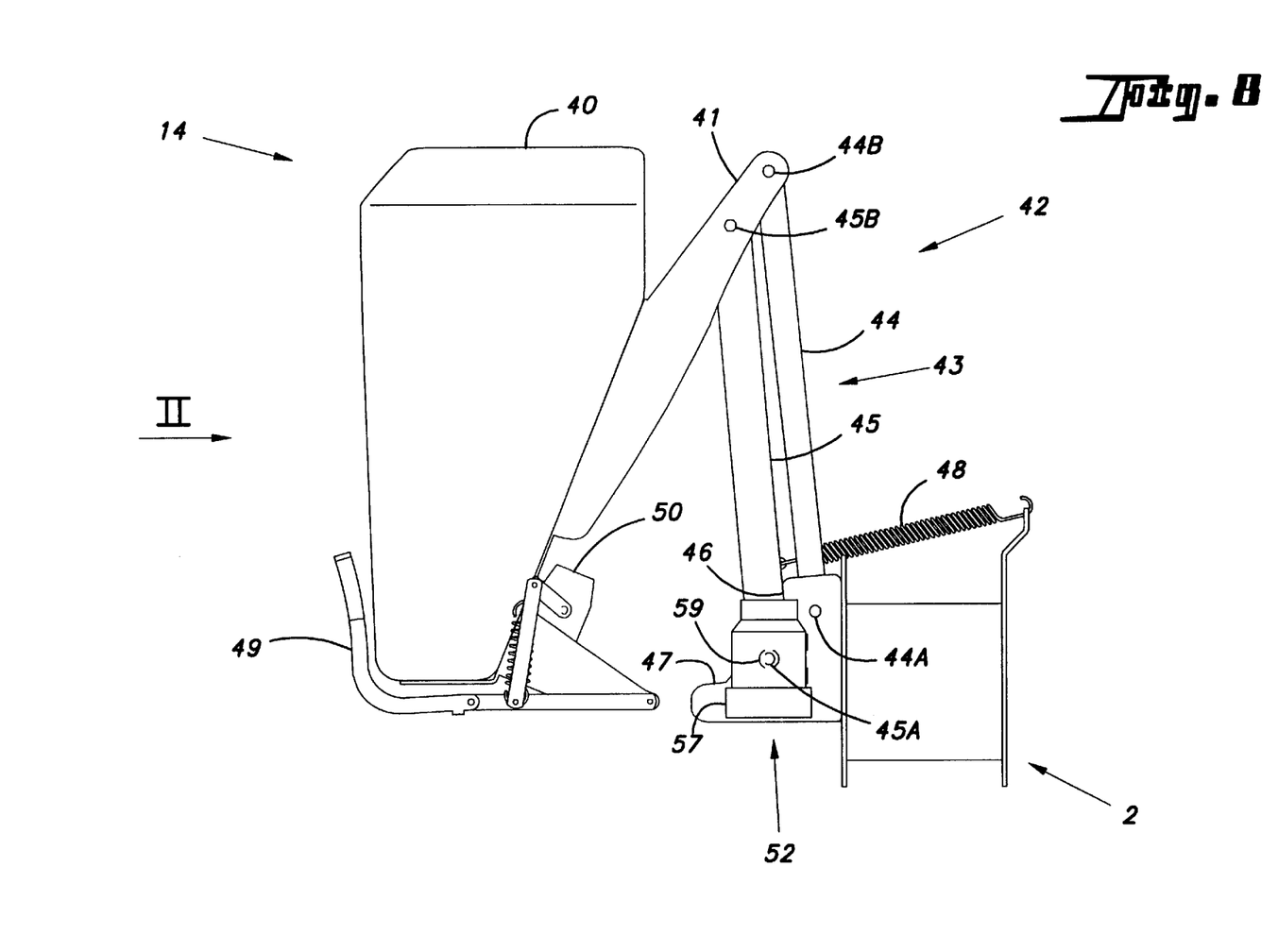
FIG. 8 depicts, viewed in the direction of arrow I defined in FIG. 1, an induction unit equipping the agricultural sprayer of FIG. 1, said induction unit being in the transport position.
Figure 9:
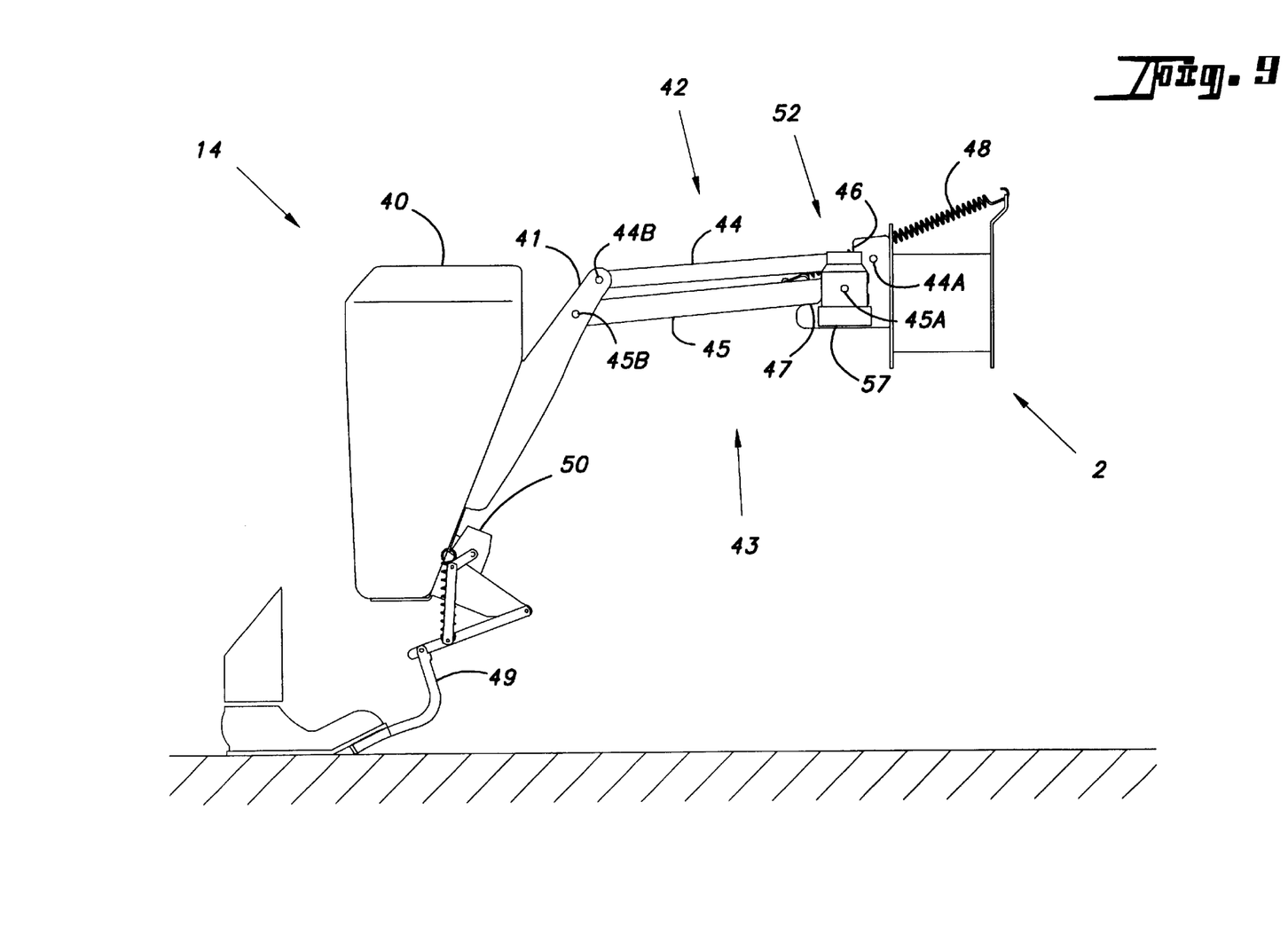
FIG. 9 depicts, also viewed in the direction of arrow I, the induction unit in the filling position.
Figure 10:
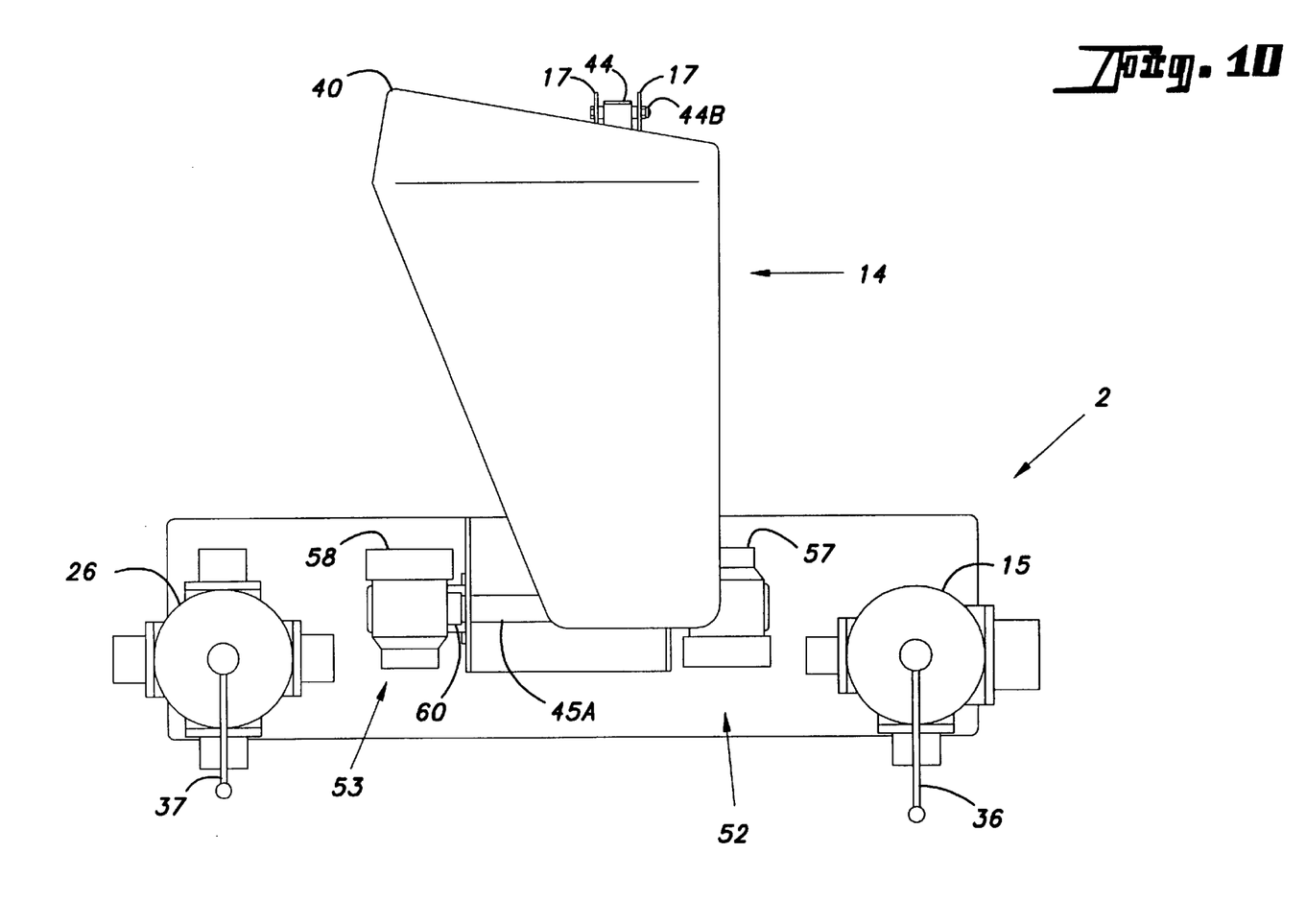
FIG. 10 depicts, viewed in the direction of arrow II defined in FIG. 8, the induction unit being in the transport position.

It will be noted that for reasons of clarity, said set of pipes of said water circuit 11 does not appear in FIGS. 8 to 10.

In the exemplary embodiment depicted in FIGS. 8 to 10, said tub 40 is supported by a framework 41. For its part, said framework 41 is connected to said chassis 2 by means of an articulated arm 42. Said articulated arm 42 is produced in the form of a parallelogram 43 made up of an upper rod 44 and of a lower rod 45. Said rods 44, 45 are connected, on one hand, to said chassis 2 by means of a respective articulation 44A, 45A and, on another hand, to said framework 41 by means of a respective articulation 44B, 45B. Said articulations 44A, 45A, 44B, 45B are advantageously of the pivot type, the respective axes of which are substantially mutually parallel. Said parallelogram 43 extends in a plane of extension that is substantially vertical, and the angular travel of the lower rod 45 about the articulation 45A is delimited by two stops 46, 47.

Said articulated arm 42 advantageously additionally includes a tension spring 48 connected, on one hand, to said chassis 2 and, on another hand, to said lower rod 45. Said tension spring 48 makes it possible, on one hand, to keep said induction unit 14 in the transport position by pressing said lower rod 45 against the upper stop 46. On another hand, said tension spring 48 also makes said induction unit 14 easier to move from the filling position to the transport position by taking at least some of the weight of said induction unit 14. However, the anchoring points of said tension spring 48 are advantageously determined so that in the filling position, said lower rod 45 rests against the lower stop 47 in spite of the force exerted by the tension spring 48. Said induction unit 14 can thus easily be translated from a transport position which, amongst other things, makes the spraying operations easier (FIGS. 1, 8 and 10), to a filling position making access to said tub 40 easier (FIG. 9), and vice versa.

According to the exemplary embodiment depicted in FIGS. 8 to 10, the user initiates the emptying of said induction unit 14 by acting on a pedal 49, said pedal 49 in turn actuating an emptying valve 50 (FIG. 9). More specifically, in the light of FIGS. 2 to 10, said emptying valve 50 is connected between the bottom of said tub 40 and the intake orifice 51A of an injector 51 (not depicted in FIGS. 8 to 10). The role of said injector 51 will be specified later on.

In this exemplary embodiment, said pedal 49 and said emptying valve 50 advantageously constitute a safety element preventing any accidental return of fluid into said tub 40. What happens is that, when the user is not acting on said pedal 49, the latter automatically keeps said emptying valve 50 in the closed position. For further details about the operation of said emptying valve 50 those skilled in the art can refer to U.S. application Ser. No. 09/899,154.

According to one feature of the present invention, a movement of said induction unit 14 from a transport position into a filling position switches the configuration of said water circuit to the "induction" mode. In addition, according to another feature of the present invention, a movement of said induction unit 14 from a filling position to a transport position cancels said configuration in the "induction" mode. Said water circuit 11 therefore reverts to the configuration used beforehand.

For this purpose, in the exemplary embodiment depicted in FIGS. 2 to 7, said water circuit 11 additionally includes two shut-off valves 52, 53. Said first shut-off valve 52 is inserted between said pump 12 and said second selector valve 26. Said fifth pipe 28 is therefore made up of two portions 28a, 28b. The first portion 28a connects said delivery orifice 27 of said pump 12 to said first shut-off valve 52. The second portion 28b, for its part, connects said first shut-off valve 52 to said inlet port 26E of said second selector valve 26. For its part, said second shut-off valve 53 is inserted between said pump 12 and said injector 51. Thus, said second shut-off valve 53 is connected, on one hand, to the delivery orifice 27 of said pump 12, by means of an eleventh pipe 54. On another hand, said second shut-off valve 53 is connected to the inlet orifice 51B of said injector 51 by means of a twelfth pipe 55. Said injector 51 also has an outlet orifice 51C connected to said main tank 4 by means of a thirteenth pipe 56.

In the exemplary embodiment depicted in FIGS. 2 to 7, said eleventh pipe 54 is not directly connected to the delivery orifice 27 of said pump 12. What happens is that said eleventh pipe 54 is advantageously connected to said first section 28a of said fifth pipe 28. Likewise, said thirteenth pipe 56 is not directly connected to said main tank 4. What happens is that said thirteenth pipe 56 is connected to said ninth pipe 35. That advantageously makes it possible to reduce the length of said pipes 54, 56 and therefore to reduce the costs of manufacture of said water circuit 11.

According to the exemplary embodiment depicted in FIGS. 8 to 10, said shut-off valves 52, 53 respectively include a body 57, 58 and an operating rod 59, 60. In a way known to those skilled in the art, rotating said operating rod 59, 60 causes said corresponding shut-off valve 52, 53 to open or to close.

In the light of FIG. 10, said operating rods 59, 60 are advantageously connected to said articulation 45A. As said articulation 45A is itself connected in terms of rotation to said lower rod 45, movement of said induction unit 14 thus causes said shut-off valves 52, 53 to open or to close. For its part, the respective body 57, 58 of each shut-off valve 52, 53 is advantageously connected to said chassis 2. Preferably, said shut-off valves 52, 53 are arranged in close proximity to said articulation 45A. As a result, said operating rods 59, 60 can be connected directly to said articulation 45A.

According to the exemplary embodiment depicted in the figures, said shut-off valves 52, 53 are two identical valves mounted top to toe at a respective end of said articulation 45A (FIG. 10). As a result, said shut-off valves 52, 53 are advantageously arranged in such a way that a movement of said induction unit 14 on one hand causes one of said shut-off valves 52, 53 to open and on another hand causes the other of said shut-off valves 52, 53 to close.

More specifically, when said induction unit 14 is in the filling position (FIG. 9), said first shut-off valve 52 is closed and said second shut-off valve 53 is open. In consequence, when referring to FIG. 7 in which said water circuit 11 is configured in the "induction" mode, all of the fluid delivered by said pump 12 is directed toward said main tank 4 through said injector 51. In a way known to those skilled in the art, the circulation of a fluid through the inlet orifice 51B of said injector 51 causes a depression at said intake orifice 51A. Thus, when the user operates said pedal 49, the contents of said tub 40 are emptied into said main tank 4. As said first shut-off valve 52 is closed, the configuration of said water circuit 11 in the "induction" mode therefore does not depend on the position of said second selector valve 26. Likewise, executing the "induction" function is independent of the position of said first selector valve 15. The user can thus advantageously empty the contents of said tub 40 by pumping the water initially contained in the main tank 4 (FIG. 7) or pumping the water originating from an external source (FIG. 5) or even using the water from the rinsing tank (FIGS. 3, 4). The movement of said induction unit 14 into the filling position therefore automatically causes said water circuit 11 to configure itself in the "induction" mode.

By contrast, when said induction unit 14 is in the transport position (FIGS. 1, 8 and 10), said first shut-off valve 52 is open and said second shut-off valve 53 is closed. In consequence, all of the fluid delivered by said pump 12 is directed toward said second selector valve 26. The "filling", "spraying", "rinsing" and "emptying" functions therefore take place as described previously. Likewise, the type of function executed by said water circuit 11 once again depends on the position of said selector valves 15, 26. Moving said induction unit 14 into the transport position therefore automatically causes the configuration of said water circuit 11 in the "induction" mode to be canceled.

The water circuit 11 and the agricultural sprayer 1 which have just been described are merely examples which must not in any case be taken to limit the field of protection defined by the claims which follow.

Specifically, said shut-off valves 52, 53 and said eleventh pipe 54 may be replaced by a third selector valve (not depicted) having one inlet port and two outlet ports. Said inlet port is connected to said first section 28a, a first outlet port is connected to said second section 28b, and the second outlet port is connected to said twelfth pipe 55. The operating rod of said third selector valve also being connected to said articulation 45A, the movement of said induction unit 14 places said pump 12 in communication either with said second selector valve 26 or with said injector 51.

The switching method which is the subject of the present invention can also be applied to a water circuit in which the valves are driven by a control unit. As said control unit is informed of the movement of said induction unit by means of a sensor, it can configure said water circuit accordingly.

What is claimed as new and desired to be secured by Letters Patent of the United States is:

1. A method for switching a configuration of a water circuit of an agricultural sprayer to induction mode, said method comprising:

providing a sprayer comprising an induction unit comprising a tub configured to allow a user can to tip cans of active compound therein, said induction unit being moveable with respect to said sprayer so that said moving induction unit is capable of occupying at least one transport position and at least one filling position, thereby making access to said tub easier; and moving said induction unit from a transport position into a filling position, wherein a movement of said induction unit from a transport position into a filling position switches the configuration of said water circuit to the induction mode.

2. Method as claimed in claim 1, wherein movement of said induction unit from a filling position to a transport position cancels said induction mode configuration.

3. An agricultural sprayer for implementing the method of claim 1, said agricultural sprayer comprising:

chassis;

an induction unit comprising a tub configured to allow a user to tip cans of active compound therein, said induction unit being moveable with respect to said sprayer so that said induction unit is capable of occupying at least one transport position and at least one filling position, thereby making access to said tub easier; and a water circuit, comprising at least one pump, at least one valve and a set of pipes, wherein movement of said induction unit causes a change in position of at least one valve.

4. Agricultural sprayer as claimed in claim 3, wherein said valve, a position of which is changed during a movement of said induction unit, is arranged downstream of said pump.

5. Agricultural sprayer as claimed in claim 3, wherein, when said induction unit occupies a filling position, at least some of a fluid delivered by said pump is directed toward said induction unit.

6. Agricultural sprayer as claimed in claim 3, wherein said induction unit is connected to a chassis of said sprayer by means of at least one pivoted articulation.

7. Agricultural sprayer as claimed in claim 6, wherein said valve, a position of which is changed when said induction unit is moved, is arranged substantially close to one of said at least one articulation.

8. Agricultural sprayer as claimed in claim 6, wherein said valve, a position of which is changed when said induction unit is moved, has a body connected to said chassis.

9. Agricultural sprayer as claimed in claim 3, wherein a movement of said induction unit gives rise to a change in position of two valves.

10. Agricultural sprayer as claimed in claim 3, wherein said sprayer is a trailed sprayer.

11. An agricultural sprayer, comprising:

a chassis;

an induction unit capable of occupying at least one transport position and at least one filling position and movement of said induction unit from a transport position into a filling position switches the configuration of said water circuit to the induction mode; and a water circuit, said water circuit itself including at least one pump, at least one valve and a set of pipes, wherein movement of said induction unit causes a change in position of at least one valve, said induction unit is connected to a chassis of said sprayer by means of at least one pivoted articulation, and said valve, a position of which is changed when said induction unit is moved, includes an operating rod connected to one of said at least one articulation.

12. Agricultural sprayer as claimed in claim 11, wherein said operating rod is connected directly to one of said at least one articulation.

13. An agricultural sprayer, comprising:

a chassis;

an induction unit capable of occupying at least one transport position and at least one filling position and movement of said induction unit from a transport position into a filling position switches the configuration of said water circuit to the induction mode; and a water circuit, said water circuit itself including at least one pump, at least one valve and a set of pipes, wherein movement of said induction unit causes a change in position of at least one valve, said induction unit is connected to a chassis of said sprayer by means of at least one pivoted articulation, a movement of said induction unit gives rise to a change in position of two valves, and a movement of said induction unit causes, on one hand, one of said two valves to open and, on another hand, the other of said two valves to close.

14. An agricultural sprayer, comprising:

a chassis;

an induction unit capable of occupying at least one transport position and at least one filling position and movement of said induction unit from a transport position into a filling position switches the configuration of said water circuit to the induction mode; and a water circuit, said water circuit itself including at least one pump, at least one valve and a set of pipes, wherein movement of said induction unit causes a change in position of at least one valve, said induction unit is connected to a chassis of said sprayer by means of at least one pivoted articulation, a movement of said induction unit gives rise to a change in position of two valves, a movement of said induction unit gives rise to a change in position of two valves, and said induction unit is connected to a chassis of said sprayer by means of at least one pivoted articulation, said two valves have respective operating rods, and said operating rods are configured to be connected to a same articulation.

15. Agricultural sprayer as claimed in claim 14, wherein said two valves are arranged at a respective end of said articulation.

* * * * *